April 7, 1931.　　　　　J. ALTLAND　　　　　1,799,721
HEDGE TRIMMER
Original Filed May 9, 1929　　2 Sheets-Sheet 1
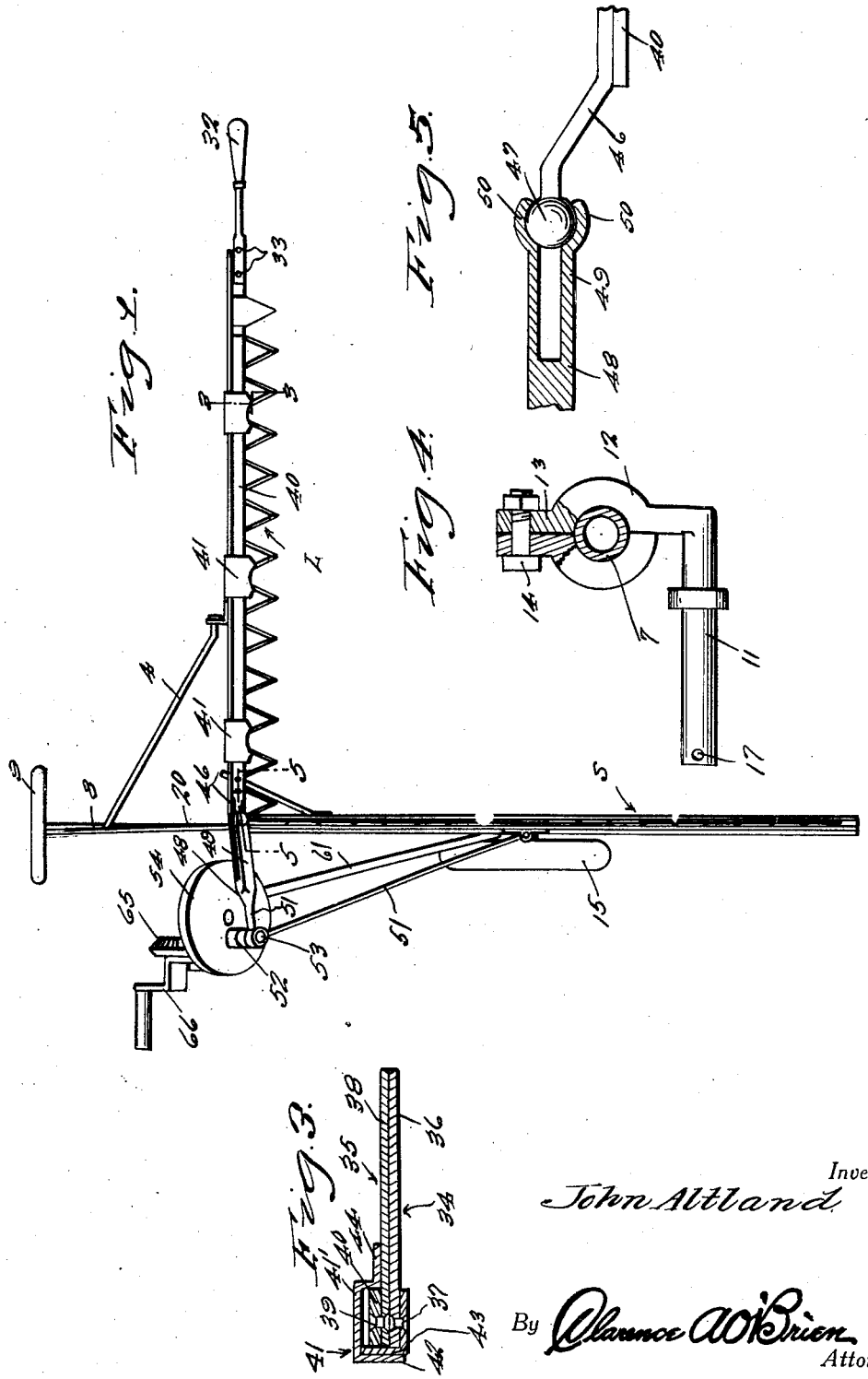
Inventor
John Altland,
By Clarence A. O'Brien
Attorney

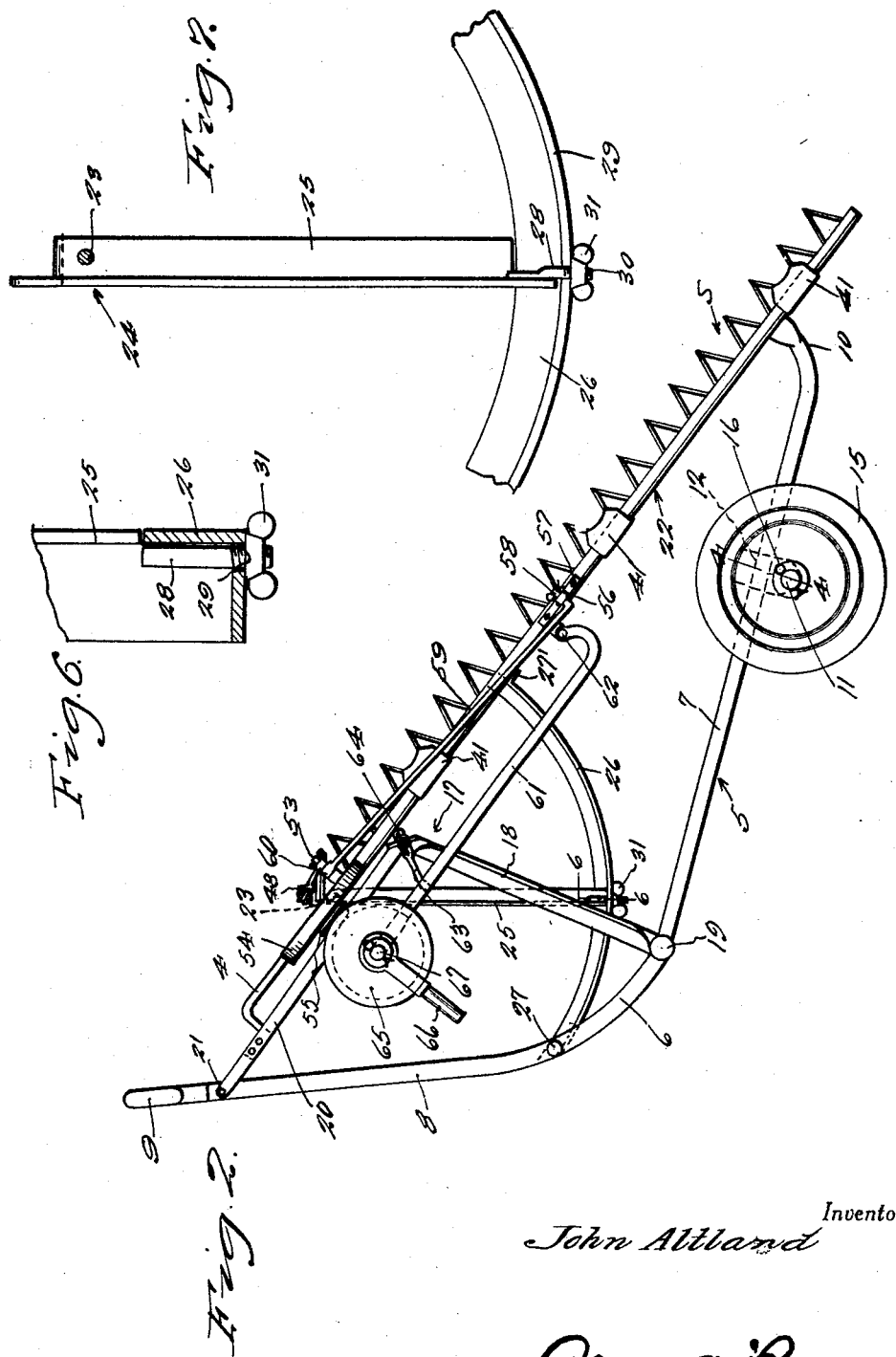

Patented Apr. 7, 1931

1,799,721

UNITED STATES PATENT OFFICE

JOHN ALTLAND, OF DOVER, PENNSYLVANIA

HEDGE TRIMMER

Application filed May 9, 1929, Serial No. 361,719. Renewed December 17, 1930.

This invention relates to what is known in the art as hedge trimmers, and has as its primary object the provision of an improved hedge trimmer wherein the hedge may be trimmed along the top and sides thereof during the one operation.

Another very important object of the invention is to provide a trimmer of this nature, comprising a pair of cutting members, one of which is adapted to extend along the top of the hedge, along the side of the hedge, together with means for adjusting the cutting members relative to one another to compensate for the decrease for the height of the hedge during the cutting operation thereof.

Another very important object of this invention is to provide a hedge trimmer which is very simple in construction, strong, durable, practicable, capable of adjustment whereby it may be used for hedges of varying sizes, practicable and thoroughly reliable and efficient in use.

Other objects and advantages of the invention will become apparent during a study of the following description taken in connection with the accompanying drawings, wherein:

Figure 1 is a top plan view of a hedge trimmer constructed in accordance with this invention.

Figure 2 is a side elevation thereof.

Figure 3 is a detail sectional view taken on the line 3—3 of Figure 1.

Figure 4 is a detail sectional view taken on line 4—4 of Figure 2.

Figure 5 is a detail sectional view taken on line 5—5 of Figure 1.

Figure 6 is a fragmentary detail sectional view taken on line 6—6 of Figure 2.

Figure 7 is a detail view showing the adjusting means for one of the cutters.

With reference more in detail to the drawings it will be seen that my improved hedge trimmer comprises a main wheel supported member designated generally by the reference character 5. This main supporting member 5 is in the nature of a bar of elongated construction and bent intermediate its ends to provide the bent portion 6, the forwardly extending portion 7, and the rearwardly and upwardly inclined portion 8.

The rearwardly and upwardly inclined portion 8 of the bar terminates in a suitable handle 9, while the forwardly and downwardly inclined portion 7 terminates in an upwardly and forwardly curved extremity 10. A stub axle 11 terminates in one end in a right angularly disposed split clamp 12 for securing the said axle adjustably on the portion 7 of the rod 5. The split clamp 12 comprises the ears 13 provided with bolt openings to receive a bolt 14 for holding the axle in adjusted position upon the rod 5. Journaled on the stub axle 11 is a suitable wheel 15, which is rotatably held thereon by means of a cotter pin 16 passing through an opening 17 formed in the extremity of the axle. An L-bar denoted generally by the reference character 17 is adapted intermediate its ends to provide a leg 18, the free end of which leg is fixed to the bar 5 adjacent the curved portion 6 and at the junction of the curve and the forwardly extending portion 7 as at 19. The leg 20 of the bar 17 has its free end fixed to the upstanding and rearwardly inclined portion 8 of the bar 5 adjacent the handle 9 as at 21. A cutter supporting bar designated generally by the reference character 22 adjacent one end is suitably fixed to the extremity 10 of the bar 5 by welding or in any other suitable manner, and the opposite end of this cutter supporting bar 22 is pivotally connected to a second cutter supporting bar as at 23. The second cutter supporting bar designated generally as at 24 is bent adjacent one end to provide the downwardly depending leg 25, the end of which leg 25 is movable on an arcuate shaped bar 26, one end of which arcuate shaped bar 26 is fixed to the main supporting bar 5 at the juncture of the curved portion 6 of the bar 5 and the rearwardly and upwardly inclined portion 8 as at 27'. The opposite end of the arcuate member 26 is fixed to the cutter supporting bar 22 intermediate the ends of the bar 22 as at 27. Thus it will be seen that the cutter bar 22 is supported on the main supporting member 5 in such a manner as to extend upwardly and rearwardly of the member 5, and this supporting bar 22 is adapted to support the cutting means for fitting the bar to the hedge.

The extremity of the adjusting leg 25 is provided with a shank 28 depending downwardly therefrom, and this shank 28 is adapted for reciprocating movement within a slot 29 extending for the full length of the arcuate shaped member 26. The shank 28 is provided with a threaded portion 30 for receiving a suitable thumb nut 31 for holding the leg in an adjusted position on the arcuate shaped member 26, the leg 25 of course being moved lengthwise of the arcuate member 26 so as to adjust the angle of the second cutter bar 24. The cutter supporting bar 24 is of course horizontally disposed and extends at substantially a right angle to the cutter supporting bar 22 as clearly illustrated in Figure 1. A suitable handle 32 is fixed to the free extremity of the cutter supporting bar 24 as at 33 so that while one person is holding the handle 9 for moving the trimmer along the hedge, a second person or helper holding the handle 32 will aid in maintaining the trimmer in proper position for trimming the hedge along the top of the hedge. On each of the cutter supporting bars 22 and 24 are a pair of cutting members each designated generally by the reference characters 34 and 35, respectively. The cutting member 34 comprises the blades 36, which blades are in the form of conventional mower blades, and each of the said blades are riveted to their respective supporting members as at 37. The cutter member 35 is of course the movable cutter member and is adapted to reciprocate relative to the stationary cutter member 34 and this cutter member 35 comprises the blades 38 of conventional construction, and each of which is riveted as at 39 to an elongated sickle bar 40 as clearly illustrated in Figure 3. Suitable guide members 41 are supported on each of the cutter supporting members and in spaced relation to one another, and each of the said guides 41 comprises a central plate 41′ having a downwardly depending flange 42 disposed in overlapping relation to the upstanding portion 43 of each of the cutter supporting members 22 and 24. The guides have the plates 41 provided on its opposite edge with a downwardly and outwardly disposed portion 44, thus providing suitable guide means for the movable cutters 35. The cutting elements carried by the supporting member 24 will now be designated generally by the reference character L and of course it will be understood that the cutters L will be disposed in a horizontal plane to project laterally from the supporting member 24, and the movable cutter member 35 of the cutter L terminates at one end in an offset shank like member 46, which member 46 terminates in a ball 47. A connecting member 48 comprises a pair of spaced parallel arms 49, the extremities of which arms 49 are curved outwardly as at 50 and cooperate to provide a socket for receiving the ball 47 as shown in Figure 5.

The connecting member 48 merges at its opposite end into a shank 51 to be fixed as at 52 to an eccentric 53 projecting from one face of a disc 54, the opposite face of which disc 54 is provided with a beveled gear 55 for a purpose to be hereinafter more fully set forth. The cutting elements 34 and 35 mounted on the cutter supporting member 22 are designated generally by the reference character S, and it will be noted that these cutting elements extend upwardly from the supporting member 22 since they are to be adapted for cutting the side of the hedge during the operation of the trimmer. The movable cutting member 35 of the cutter S has fixed to its base bar, intermediate the ends of the bar a bracket 56 as at 57.

The bracket 56 pivotally receives the one end 58 of an operating link 59, the opposite end of said link 59 being fixed to the eccentric 53 as at 60. Fixed to the supporting member 22 adjacent the bracket 56 is the curved extremity of a supporting bar 61 pivotally mounted to the said member 22 as at 62. This bar 62 extends rearwardly and outwardly of the member 22 to be adjustably supported on the member 17 at the juncture of the leg of the member by means of an adjustable link 63 extending laterally from the bar 61 and having a slotted portion adapted to be fixed to the member 17 by any suitable adjusting means such as the means 64, illustrated. The free end of the bar 61 has rotatably mounted thereon a beveled gear 65 adapted to mesh with the gear 55 as shown to advantage in Figure 6. The gear 65 is provided with a suitable actuating handle 66 fixed thereto as at 67. Thus it will be seen by actuating the gear 35 through the medium of the handle 66 the said gear in mesh with the gear 55 will cause rotation of the disc 54 to cause a simultaneous reciprocation of the movable cutter members 35 whereby it will be seen that the top and side of the hedge will be simultaneously trimmed.

When using a hedge trimmer of this type, it has been found that when the hedge is of such height that the portion 7 of the rod 5 needs must be practically parallel to the ground it is obvious that the supporting member 24 would extend along the top of the hedge at an angle to the hedge which of course would seriously hamper the cutting of the top portion of the hedge. To overcome this difficulty then I have provided the adjusting means comprising the adjusting legs 25 movable on the arcuate member 26 so that, it will be seen in order to bring the adjusting member 24 on a horizontal plane with the top of the head the adjusting leg 25 may be moved rearwardly, or as in this case, to the left hand end of the arcuate member 26 thus permitting a downward movement of the supporting member 24 whereby the same will be brought on a horizontal plane with the top of the hedge and thus permit the true cutting of the top part of the hedge. When using the trimmer with a hedge of considerable height, the wheels 15 may be adjusted on the bar 5 so as to be disposed at the upwardly and forwardly bent portion 10 whereby the portion 7 may extend at substantially a right angle to the surface of the ground, whereupon it will be seen that the adjusting member 24 would be disposed at almost a right angle to the top of the hedge which of course would prevent suitable operation of the cutting member L for trimming the top of the hedge. To overcome this then it will be readily seen that by moving the leg 25 to the right of the arc 26 the adjusting member 24 will be brought upwardly so as to extend in a horizontal plane to the top of the hedge and thus permit proper cutting action of the cutting member L so as to provide a neat trim for the top of the hedge.

From the foregoing then it will be seen that I have provided a novel hedge trimmer which can be readily adapted to any hedge of no matter what the height of the hedge may be, and will trim the hedge in a reliable and efficient manner both along the top and side of the hedge.

Even though I have herein shown and described certain detail structural elements of the invention it is to be understood that the same is capable of changes fully comprehended by the spirit of the invention and the scope of the appended claims.

Having thus described the invention, what I claim as new and desire to secure by Letters Patent is:—

1. In a device of the character described, a bar bent intermediate its ends to provide a rearwardly extending portion terminating in a handle, and a forwardly extending portion, a wheel adjustably mounted on said forwardly extending portion, a supporting member having one end fixed to the forward end of the bar and inclining rearwardly and upwardly from the bar, an arcuate shaped member having one end fixed to the bar and its opposite end fixed to the free end of the supporting member, a second supporting member bent intermediate its ends to provide a right angularly disposed leg operatively engaging the arcuate member, means for pivotally connecting the supporting members, cutting elements carried by each of the said supporting member, and means for simultaneously operating the cutting elements.

2. In a device of the character described, a bar bent intermediate its ends to provide a rearwardly and upwardly extending portion terminating in a handle, and a forwardly and downwardly inclined portion terminating in an upwardly and forwardly extending extremity, a cutter supporting member, one end of said cutter supporting member being fixed to the extremity of said bar, and said cutter supporting member adapted to extend upwardly and rearwardly of the bar, an arcuate shaped member having one end fixed to the bar adjacent the upwardly extending portion, and the other end of said arcuate member being fixed to the cutter supporting member adjacent the rear end of said cutter supporting member, a second cutter supporting member, said second cutter supporting member being bent adjacent one end to provide a downwardly extending leg adapted to be movably supported on said arcuate member, means for pivotally connecting the said supporting members, cutting elements carried by each of said cutter supporting members, means for simultaneously operating the cutter elements.

3. In a device of the class described, a bar bent intermediate its ends to provide a rearwardly and upwardly extending portion terminating in a handle, and a forwardly extending portion having a wheel adjustably mounted thereon, a cutter supporting member, said cutter supporting member adjacent one end being fixed to the forward end of said bar, and adapted to incline rearwardly from the bar, an arcuate shaped member having one end fixed to the bar and its opposite end fixed to the supporting member adjacent the free end of said supporting member, a second cutter supporting member extending at right angles to said first cutter supporting member and pivotally associated therewith, said second supporting member having a right angularly disposed leg operatively engaging the arcuate member, a rotatable disc, cutting elements on each of said cutter supporting members, means operatively connecting the disc with each of said cutting elements, and manually controlled means for rotating the disc.

4. In a trimming device of the character described, a main wheel supported member, a cutter supporting member extending upwardly and rearwardly of said main wheel supported member, said cutter supporting member having one end thereof fixed to the first mentioned member, an arcuate shaped slotted member having one end fixed to said wheel supported member and its opposite end fixed to the upper end of said cutter supporting member, a second cutter supporting member, said second cutter supporting member being bent adjacent one end to provide a downwardly extending leg terminating in a shank operable in the slot of said arcuate member, said shank being threaded, a nut threaded on said shank for engagement with said arcuate member, means for pivotally connecting said cutter supporting members.

In testimony whereof I affix my signature.

JOHN ALTLAND.